(12) United States Patent
Ala-Luukko

(10) Patent No.: US 7,525,987 B2
(45) Date of Patent: Apr. 28, 2009

(54) CHANGING A FIRST SUBSCRIBER IDENTIFIER TO A SECOND IDENTIFIER

(75) Inventor: Sami Ala-Luukko, Helsinki (FI)

(73) Assignee: Data Advisors LLC, Las Vegas, NV (US)

( * ) Notice: Subject to any disclaimer, the term of this patent is extended or adjusted under 35 U.S.C. 154(b) by 1127 days.

(21) Appl. No.: 10/243,071

(22) Filed: Sep. 12, 2002

(65) Prior Publication Data

US 2003/0050047 A1    Mar. 13, 2003

Related U.S. Application Data

(63) Continuation of application No. PCT/FI01/00305, filed on Mar. 29, 2001.

(30) Foreign Application Priority Data

Mar. 31, 2000    (FI)    ................................. 20000751

(51) Int. Cl.
*H04W 4/00* (2006.01)
*H04W 40/00* (2006.01)
*H04L 12/28* (2006.01)
*H04J 3/16* (2006.01)

(52) U.S. Cl. .................. 370/465; 370/401; 370/329; 455/445; 455/433

(58) Field of Classification Search ................ 370/330, 370/466, 338, 352, 442, 401, 328, 349, 465, 370/467; 455/435.1, 406, 409, 433, 432.3, 455/432.2, 445, 426, 432; 709/203, 219, 709/227, 228
See application file for complete search history.

(56) References Cited

U.S. PATENT DOCUMENTS

| | | | | |
|---|---|---|---|---|
| 5,337,344 A | | 8/1994 | Alvesalo | |
| 5,822,518 A | * | 10/1998 | Ooki et al. | 726/6 |
| 5,854,982 A | * | 12/1998 | Chambers et al. | 455/445 |
| 6,097,942 A | | 8/2000 | Laiho | |
| 6,466,571 B1 | * | 10/2002 | Dynarski et al. | 370/352 |
| 6,549,776 B1 | * | 4/2003 | Joong | 455/433 |
| 6,587,684 B1 | * | 7/2003 | Hsu et al. | 455/419 |
| 6,662,017 B2 | | 12/2003 | McCann et al. | |
| 6,665,529 B1 | * | 12/2003 | Mills, Jr. | 455/411 |

(Continued)

FOREIGN PATENT DOCUMENTS

EP    1 041 844 A2    10/2000

(Continued)

OTHER PUBLICATIONS

Numbers and Identities for Emerging Wireless/PCS Networks, Raj Pandya, Nortel Wireless Systems Engineering, IEEE pp. 8-14 (Jun. 1997).

*Primary Examiner*—Hanh Nguyen
(74) *Attorney, Agent, or Firm*—Foley & Lardner LLP

(57) ABSTRACT

The invention relates to telecommunications systems, in which a subscriber is identified in a network with a first identifier and with a second identifier in a server providing services to the subscriber through the network. In the invention, the first identifier is changed (3-3) in a message to be transferred to the server to a second identifier before transferring the message to the server. Thus the message received from the network can be associated with a particular subscriber in the server.

25 Claims, 2 Drawing Sheets

U.S. PATENT DOCUMENTS

| | | | |
|---|---|---|---|
| 6,684,073 B1 * | 1/2004 | Joss et al. | 455/433 |
| 6,775,262 B1 * | 8/2004 | Skog et al. | 370/349 |
| 6,977,917 B2 * | 12/2005 | Skog et al. | 370/349 |
| 7,047,560 B2 * | 5/2006 | Fishman et al. | 726/6 |
| 7,079,517 B2 * | 7/2006 | Verkama | 370/338 |

FOREIGN PATENT DOCUMENTS

| | | |
|---|---|---|
| WO | WO 95/27382 | 10/1995 |
| WO | WO 97/47146 | 12/1997 |
| WO | WO 98/02011 | 1/1998 |
| WO | WO 00/70900 | 11/2000 |

* cited by examiner

CHANGING A FIRST SUBSCRIBER IDENTIFIER TO A SECOND IDENTIFIER

This application is a Continuation of International Application PCT/FI01/00305 filed 29.3.2001 which designated the U.S. and was published under PCT Article 21 (2) in English.

BACKGROUND OF THE INVENTION

The invention relates to connecting a message received from a network to a particular subscriber in a server of a service provider when the service provider identifies the subscriber with a different identifier than what the network conveying the service employs for identifying the subscriber in the messages associated with the subscriber.

Services offered by means of telecommunications systems, particularly mobile communications systems, are being continuously improved. At the same time as services are diversified, separate service providers are increasingly participating in providing such services, to whom the actual network operators sell data transmission services. The service providers provide services for the end users through separate servers, which are connected to the network of the network operator. Examples of different servers are WAP servers (Wireless Application Protocol) and what are known as push servers.

The service providers and the servers generally employ the telephone number of the subscriber for identifying the subscriber, which for example in the Pan-European GSM system (Global System for Mobile Communication) is an MSISDN (Mobile Subscriber International ISDN number). However, the telephone number is not used in mobile communication networks for identifying the subscriber, instead the subscriber is generally identified using a mobile station subscriber identifier, which in the GSM system is an IMSI (International Mobile Subscriber Identity). In the direction of a mobile station the GSM-based network also employs a TMSI identifier (Temporary Mobile Subscriber Identity). The network knows which TMSI identifier corresponds to which IMSI identifier.

When the server sends a message to the subscriber using the subscriber telephone number MSISDN, the mobile communication network changes the MSISDN number to the IMSI identifier of the mobile station subscriber. In other words the mobile communications systems include a mechanism that on the basis of the MSISDN number determines the mobile station 35 identifier IMSI. The problem with prior art mobile systems is that they lack the mechanism that allows to determine the MSISDN number using the mobile station subscriber identifier IMSI. Therefore, information associated with the subscriber cannot be transferred directly from the mobile communications network to the server, for example billing information so that the server knows to which subscriber the information is assigned. As the subscriber is identified in the network information with a subscriber identifier, the server is unaware of which subscriber telephone number) the identifier is assigned to, and is therefore unable to utilize the information.

BRIEF DESCRIPTION OF THE INVENTION

It is an object of the invention to provide a method and an apparatus implementing the method so as to solve the above problem.

The objects of the invention are achieved with a method for connecting a message received from a network with a particular subscriber in a server, the method comprising identifying the subscriber in the network with a first identifier and in the server with a second identifier, receiving a first message to be transferred to the server including the first identifier, and changing the first identifier in the first message to the second identifier before transferring the first message to the server. The invention further relates to methods defined in independent claims 18 and 19 and having additional features to the above disclosed method.

The invention also relates to a telecommunications system comprising a network arranged to employ a first identifier for identifying a subscriber in the network and in messages to be sent from the network, a server arranged to transmit services to at least one subscriber through the network, and the server being arranged to employ a second identifier for identifying the subscriber, and a gateway node for transferring messages from the network to the server, the gateway node being arranged in response to the reception of the first message including the first identifier to change the first identifier in the first message to the second identifier before sending the message towards the server.

The invention further relates to a network node in a telecommunications system, the telecommunications system comprising a network in which a subscriber is identified with a first identifier, and a server in which the subscriber is identified with a second identifier, the network node comprising a connection part for transferring messages between the telecommunications system network and the server providing services to the subscriber through the network, and an application part for changing the first identifier in a first message sent from the network to the server to the second identifier. The invention further relates to network nodes defined in independent claims 5 15, 16 and 17 and having additional features to the above disclosed network node.

The invention also relates to a network node in a telecommunications system, the telecommunications system comprising a network in which a subscriber is identified with a first identifier, and a server in which the subscriber is identified with a second identifier, the network node comprising subscriber data that connects together the first identifier and the second identifier, the network node being arranged to employ the first identifier in messages associated with the subscriber that the network node sends, to identify a message that requests for the second subscriber identifier and includes the first identifier, and to send the message including the second identifier in response to the message.

The basic idea of the invention, is to add to the actual network or to the apparatus connecting the server to the network a mechanism, which changes the first subscriber identifier included in the message arriving from the network and used by the network to the second identifier used by the server before the message is transmitted to the server. The invention provides the advantage that a subscriber identifier IMSI is used to determine a telephone number MSISDN and thus the data associated with the subscriber can be transferred from the network to the server, so that the server identifies, with which subscriber the data is associated. This enables real-time services, for example. For instance, in services associated with location, the network may inform the server that: the location of the subscriber has changed, perform the service. Billing data can also be successfully transferred directly from the network to the server.

In a preferred embodiment of the invention a separate modification data is maintained that is determined when provisioning the service. This embodiment also provides the advantage that the data can be detected using a single signalling and the data is then available to be used by the server. The signalling load is thus minimized.

In another preferred embodiment of the invention the identifier used in the server can by means of the identifier used in the network be requested from the network node including subscriber data. This embodiment has the advantage that the telephone number and identification data of the database including subscriber data need not be multiplied, instead, for example, all gateway nodes obtain the data from one and the same database.

The preferred embodiments of the method, system and network node of the invention are disclosed in the dependent claims.

BRIEF DESCRIPTION OF THE DRAWINGS

In the following, the invention will be described in greater detail by means of the preferred embodiments with reference to the accompanying drawings, in which.

DETAILED DESCRIPTION OF THE INVENTION

The present invention can be applied to any telecommunications system, in which the server of the service provider identifies the subscriber using an identifier that is different from the one used in the network transferring the service for identifying the subscriber. Such networks include the GSM system, the following generation thereof or what are known as the GSM 2+, and corresponding systems such as the PCS (Personal Communication System) and the DCS 1800 (Digital Cellular System for 1800 MHz). The invention is also applicable to be used in what are known as the third generation mobile communications systems, such as the UMTS (Universal Mobile Telecommunications System) and the 15-41 (Interim Standard). Below, the invention is explained using the GSM system as an example system, however, without restricting the invention to such a particular system. The definitions of mobile communications systems improve rapidly. Such an improvement may require additional changes to be made to the invention. Therefore all words and expressions should be widely interpreted, as they are intended to illustrate not to limit the invention. What is essential in view of the invention is the function thereof not in which network node or apparatus the function is carried out.

Figure 1:
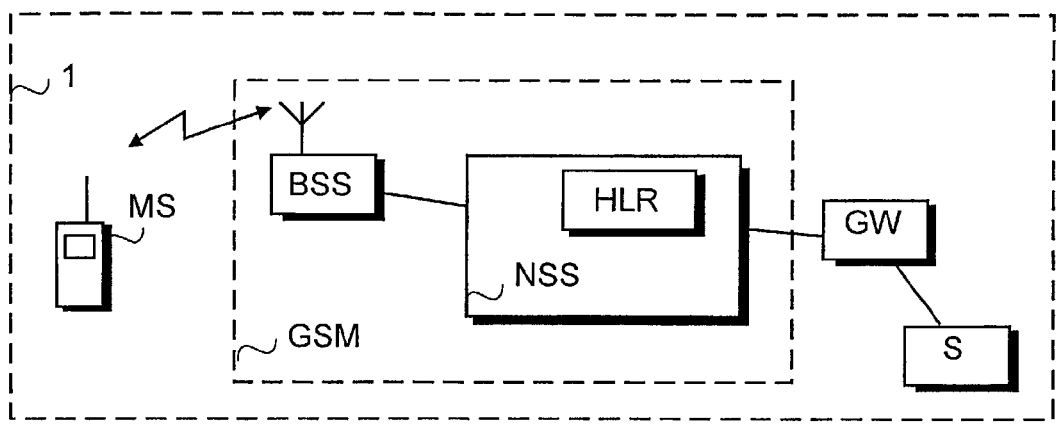
FIG. 1 illustrates network architecture.

FIG. 1 shows roughly the network architecture of the GSM system, as a more detailed structure of the system is not relevant for the invention. As to the invention, the most relevant part of the GSM system is a Home Location Register HLR, which is the only network node of the GSM system shown in FIG. 1. As for a more detailed description of the GSM system, reference is made to the volume "The GSM System for Mobile Communications", M. Mouly and M. Pautet, Palaiseau, France, 1992, ISBN:2-9507190-07-7, which is incorporated herein by reference.

The structure of the GSM network according to the GSM system 1 consists of two parts, a Base Station Subsystem BSS and a Network Subsystem NSS. The BSS and mobile stations MS communicate by means of radio connections. The base station subsystem is connected to a mobile services switching centre of the network subsystem NSS. The function of a mobile services switching centre is to connect calls involving at least one mobile station MS. Some mobile services switching centres are connected to other telecommunications networks, such as the Public Switched Telephone Networks PSTN that include interworking functions for connecting calls to and from these networks. Said mobile services switching centres are referred to as transit exchanges.

The network subsystem NSS comprises two types of databases. Subscriber data is permanently or semi-permanently stored into the home location register HLR for each network subscriber so that the subscriber data is connected to the subscriber identifier IMSI. Subscriber data include a telephone number or telephone numbers MSISDN, routing information or the current location of the subscriber and information about the services to which the subscriber has access. One IMSI may thus include several telephone numbers. The home location register HLR comprises means that allow the MSISDN to be changed into an IMSI. The home location register HLR according to a second preferred embodiment of the invention further comprises means for implementing the functions described in connection with FIG. 4. Another type of register is a visitor location register. When a mobile station MS is active (it has registered into the network and may start a call or receive a call), then the main part of the subscriber data relating to the mobile station MS in the home location register HLR is loaded (copied) into the visitor location register of the mobile services switching centre, within the area of which the mobile station MS is located.

A server S of the service operator is not an actual network element in the GSM system, but the connection thereof to the network subsystem NSS according to the GSM system 1 through a gateway node GW is known to those skilled in the art. The gateway node GW may communicate directly with the home location register HLR or the connection to the home location register may be established through a transit exchange. The gateway node GW is not necessarily a separate network node, but it can be integrated to the server or the transit exchange. However, in this application the gateway node is treated as a separate network node for the sake of clarity. The gateway node according to the first preferred embodiment of the invention is described in more detail in FIG. 5. Even though the Figure shows that the server S is connected to a single network subsystem NSS, the server S may be connected to several different network subsystems, which can be network subsystems of different network operators. One server S may also be connected to a network subsystem or network subsystems through one or more gateway nodes GW. Correspondingly one gateway node GW may serve one or more servers S.

The telecommunications system implementing the functionality of the present invention and the network node(s) comprise, in addition to the means required for carrying out prior art services, means for changing the subscriber identifier used in the network to the subscriber identifier used in the server. Current network nodes comprise processors and memory that can be utilized in the operations according to the invention. All the changes required for implementing the invention can be carried out as added or updated software routines, and/or using application circuits (ASIC). The gateway node GW according to the first preferred embodiment of the invention may also require additional memory.

Figure 2:
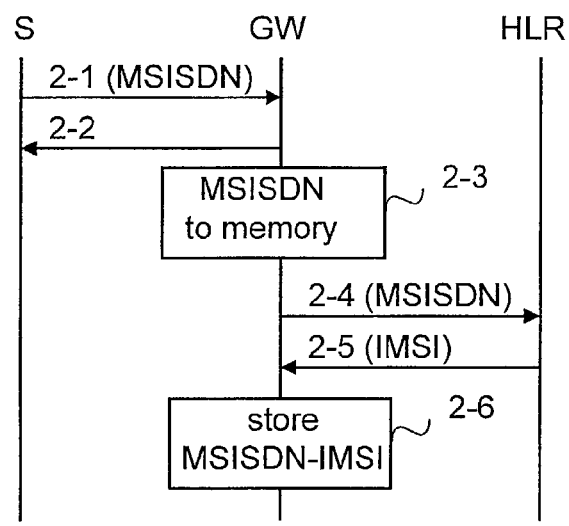
FIGS. 2 and 3 show signalling according to a first preferred embodiment of the invention.
Figure 3:
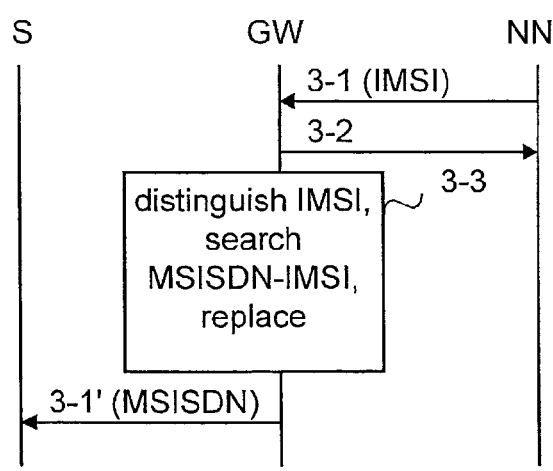

FIGS. 2 and 3 show signalling in the first preferred embodiment of the invention. In the first preferred embodiment, when provisioning the service a telephone number identifier pair, or IMSI-MSISDN pair, is stored into the gateway node GW for the subscriber. Using said pair the gateway node changes the identifier in the messages to a telephone number in the first preferred embodiment of the invention.

FIG. 2 shows the signaling that occurs when the service is provisioned in the first preferred embodiment of the invention. When a server S is informed that the subscriber with the telephone number MSISDN has ordered a service for himself/herself, the server S sends a message 2-1 to the gateway node GW and informs about the new subscriber. The message 2-1 includes at least the telephone number MSISDN of the subscriber.

After receiving the message 2-1 the gateway node GW sends an acknowledgement to the server in a message 2-2. Thereafter in step 2-3 the gateway node stores into a cache memory thereof the telephone number MSISDN in the message 2-1 and requests, for the subscriber identifier IMSI from the subscriber home location register HLR in a message 2-4. The message 2-4 includes at least the telephone number MSISDN of the subscriber. The message is preferably a routing request message according to the MAP protocol of the GSM system, but other types of messages, even equipment manufacturer specific messages can be employed. The use of the message according to the system provides the advantage that open interfaces according to standards can be utilized, thus avoiding compatibility problems and making equipment manufacturer specific definitions.

After receiving the message 2-4 including the telephone number MSISDN the home location register HLR searches from the subscriber data thereof for the identifier IMSI to which the telephone number MSISDN belongs and sends the identifier IMSI in a message 2-5 to the gateway node GW. The message 2-4 may also include other data in addition to the identifier IMSI. If the message 2-4 was a routing request message, the HLR sends a reply using routing instructions according to the MAP protocol.

After receiving the message 2-5 the gateway node GW clearly distinguishes the subscriber identifier IMSI from the message and stores the identifier IMSI in step 2-6 together with the telephone number MSISDN in the message 2-1 to form the IMSI-MSISDN pair. The gateway node ignores the other possible data in the message 2-5.

This embodiment provides the advantage that even if a subscriber identifier includes several telephone numbers, the system recognizes the particular telephone number among the other telephone numbers, to which the service is ordered, using this server. In addition the embodiment provides such an advantage that a mechanism available in the system is utilized for acquiring modification data, so that no changes are required to be made to the elements and signalling according to standard.

FIG. 3 shows the signalling associated with the subscriber service in a situation where data associated with the subscriber service is sent from the mobile communications network to the server. In other words, a network node NN sends the gateway node GW a message 3-1 that includes the subscriber identifier IMSI. The gateway support node sends the network node an acknowledgment indicating the reception of the message 3-1 in a message 3-2. Then the gateway support node distinguishes in step 3-3 the identifier IMSI in the message, searches from the database thereof for a corresponding IMSI-MSISDN pair and replaces the identifier IMSI in the message 3-1 with the telephone number MSISDN. After this, the gateway node GW sends a message 3-1' to the server. The message 3-1' differs from the message 3-1 only in 10 that the message 3-1' comprises an MSISDN whereas the message 3-1 comprises an IMSI. Since the message 3-1' includes a telephone number, the server knows with which subscriber the message is associated.

The signalling shown in FIG. 3 can be used for example for conveying billing information. Utilizing the signalling different services can be activated. For example, a service associated with the subscriber location can be activated so that when the subscriber updates the location, the visitor location register or the home location register generates the message 3-1 and sends the message to a server providing services associated with the location. As the gateway node GW replaces the identifier IMSI in the message with the identifier MSISDN, the server identifies the subscriber and may start to implement the service associated with the location, for example, by sending a short message to the subscriber.

Another example showing how the signalling is used in FIG. 3 is related to WAP services generated through General Packet Radio Service GPRS. The GPRS is a service offered in the GSM system between exterior data networks and moving data terminals of packet data transmission, where a gateway GPRS support node GGSN connects the GSM network providing GPRS services to a WAP server, for example, through a gateway node. GPRS data is included in the subscriber data of the home location register HLR in the GSM system. In order to send and receive GPRS data the mobile station (i.e. the subscriber) must activate a packet data address that it wishes to employ by requesting an activation procedure of a Packet Data Protocol PDP context. This operation renders the mobile station known in a corresponding gateway support node and the co-operation for example with a 35 WAP server may start with an activated packet data address. The packet data address can be, for example, an Internet Protocol IP address. During the activation procedure of the PDP context, the GGSN informs the WAP server about the subscriber through the gateway node GW. This piece of information is transferred using the signalling according to FIG. 3 where the network node NN corresponds to the GGSN and the server S is a WAP server. If, for example, the message 3-1 includes the IP address (i.e. the activated packet data address) in addition to the subscriber identifier IMSI when departing from the GGSN, the WAP server receives the message 3-1 that includes the telephone number MSISDN and the IP address. The WAP server stores the MSISDN-IP address pair and on the basis thereof the WAP server is able to identify the IP packet arriving from the GGSN to which MSISDN the packet (i.e. the WAP transaction) belongs. This allows to carry out, for example, billing in a WAP server.

The functionality of the invention is therefore not tied to the contents of the service or to the technical implementation of the service but it may be used as a medium in the entire data transmission or in a part of the service and more particularly in the data transmission associated with the service subscriber where data is transferred from the network to the server.

Figure 4:
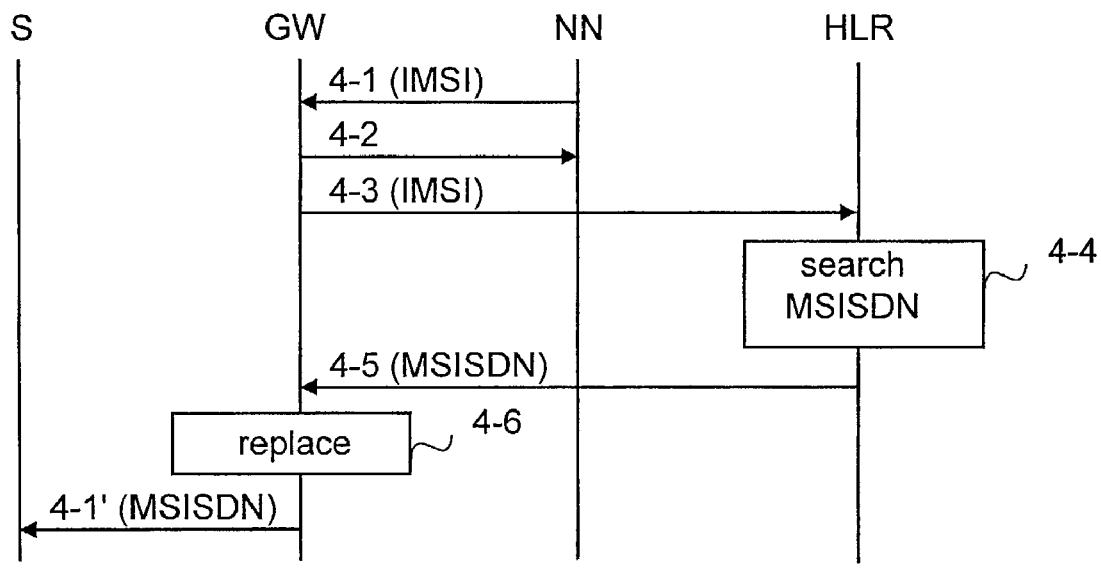
FIG. 4 shows signalling according to a second preferred embodiment of the invention.

FIG. 4 shows the signalling in a second preferred embodiment of the invention. In the second preferred embodiment of the invention the home location register HLR offers the gateway node GW an interface that can be used for requesting the telephone number MSISDN on the basis of the subscriber identifier IMSI. Therefore, in the second preferred embodiment of the invention, an exterior server S does not have to transfer data about the provisioning of the service to the gateway node GW and the gateway node does not maintain the IMSI-MSISDN pairs. In other words the signalling shown in FIG. 2 is not required in the second preferred embodiment of the invention.

FIG. 4 shows the signaling associated with the subscriber service in a situation where data associated with the subscriber service is sent from the mobile communication network to the server. In other words, the network node NN sends the gateway node GW a message 4-1 that includes the subscriber identifier IMSI. The gateway support node sends the network node an acknowledgement concerning the reception of the message 4-1 in a message 402 and requests for the subscriber's telephone number MSISDN from the home location register HLR of the subscriber in a message 4-3. The message 4-3 comprises at least the subscriber identifier IMSI but may include other information too.

After the reception of the message 4-3 comprising the identifier IMSI, the home location register HLR searches in step 4-4 from the subscriber data for the telephone number MSISDN defined for the identifier IMSI. If several telephone numbers MSISDN have been defined for the identifier IMSI, one of them is preferably defined as a default value telephone number, which the home location register HLR sends to the gateway node. The default value telephone number can be defined to be the same for all servers. It is also possible to define a specific default value telephone number for each server. It is further possible that a server-specific default value telephone number is defined only for a part of the servers, in which case one telephone number is defined to be used in the servers to which a server-specific default value telephone number is not defined. The definitions can also be carried out according to services and/or gateway nodes. The home location register HLR identifies the server preferably from the gateway node GW that sent the message 4-3. The message 4-3 may also comprise data about the server and/or the service, for which the telephone number is requested. After finding the telephone number the home location register HLR sends the telephone number MSISDN in a message 4-5 to the gateway node GW. The message 4-5 may include other information too.

After receiving the message 4-5 the gateway node GW distinguishes in step 4-6 the subscriber's telephone number MSISDN from the message and replaces the identifier IMSI in the message 4-1 with the telephone number MSISDN. Thereafter the gateway node GW sends a message 4-1' to the server. The message 4-1' differs from the message 4-1 only in that the message 4-1' comprises an MSISDN, whereas the message 4-1 comprises an IMSI. Since the message 4-1' comprises a telephone number, the server knows to which subscriber the message belongs. The gateway node 30 ignores the other eventual data included in the message 4-5.

In another embodiment of the invention another network node comprising subscriber data, such as a visitor location register VLR, may offer a corresponding interface as the home location register HLR in the second preferred embodiment of the invention.

The signalling shown in FIG. 4 can be applied to the examples shown in FIG. 3 instead of the signalling shown in FIG. 3.

The second preferred embodiment of the invention provides such an advantage that allows to avoid storing the same information, i.e. the IMSI-MSISDN pair, in at least two different places, or into the home register and the gateway nodelnodes.

The signalling messages shown above in FIGS. 2, 3 and 4 are only suggestive and may include various messages for transferring the same information. In addition, the messages may include other information too. The messages can also be freely combined and some of the messages, such as acknowledgement messages, can be ignored. Some of the messages can also be sent simultaneously or in a different order than what is shown in FIGS. 2, 3 and 4. Examples of such messages are the messages 2-2 and 2-4 as well as 4-2 and 4-3. Some of the steps can also be carried out simultaneously when sending signalling messages, or in a different order than what is shown in FIGS. 2, 3 and 4, for example step 3-3 and the message 3-2. Depending on the operators and the system, other network elements, to which the different functionalities are spread, can also participate in transferring data and signalling.

Figure 5:
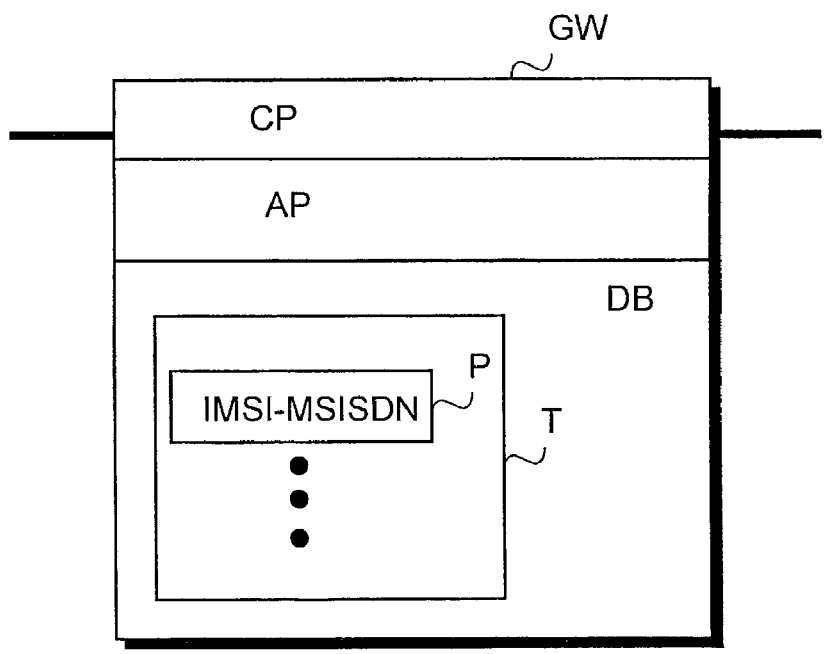
FIG. 5 is a block diagram showing a gateway node according to the first preferred embodiment of the invention.

FIG. 5 is a block diagram showing the gateway node GW according to the first preferred embodiment of the invention. In the first preferred embodiment the gateway node GW comprises a database part DB, an application part AP and a controller part CP.

The application part AP is arranged to identify the messages arriving from the network to the server and the messages destined to the server that include the subscriber identifier IMSI, and to determine the telephone number MSISDN of the subscriber on the basis of the identifier IMSI in response to the subscriber identifier IMSI in the message, and to replace the subscriber identifier IMSI in the message destined to the server with the telephone number MSISDN of the subscriber. In other words, the application part is arranged to carry out in the first preferred embodiment the functions shown in FIG. 3 and in the second preferred embodiment the functions described in FIG. 4. In the first preferred embodiment of the invention the application part AP is also arranged to identify the message sent from the server informing about the subscriber provisioning, to determine the subscriber identifier on the basis of the subscriber's telephone number and to store the subscriber identifier—telephone number pair to the database part DB. To be more precise the application part is arranged in the first preferred embodiment to carry out the functions described in FIG. 2.

In the first preferred embodiment the database part DB includes a table T that comprises IMSI-MSISDN pairs P. Table T shows which subscriber telephone number is associated with the received subscriber identifier. In the second preferred embodiment of the invention table T is not maintained in the database part. In fact, in the second preferred embodiment of the invention, a database is not need at all in the gateway node for carrying out the functionality of the invention.

The controller part CP allows the gateway node GW to receive and send messages and data to the network and to communicate with the network and the server. If the gateway node GW is integrated to another network node, it does not necessarily require a specific controller part CP, but may use the controller part of another network node.

In a third preferred embodiment of the invention, in which IMSI-MSISDN pairs P are stored into the database part DB of some subscribers and an HLR inquiry is performed for other subscribers, the application part AP is arranged to carry out at least the functionalities shown in FIGS. 2, 3 and 4 and also to select the modification manner used for the identifier by checking after receiving the message including the subscriber identifier IMSI from the network whether a pair comprising the identifier IMSI is found from the database. If such a pair is found, the application part AP changes the identifier into a telephone number, and if not found, the application part AP request for the telephone number from the home location register.

In some of the preferred embodiments of the invention the application part AP is arranged to change the subscriber identifier IMSI to the telephone number MSISDN only in certain pre-determined messages. There has to be at least one pre-determined message. In these embodiments the gateway node is arranged in response to the reception of a message arriving from the network and destined to the server, to check whether the message is one of the pre-determined messages (or a predetermined message) and to change the subscriber identifier IMSI to the telephone number MSISDN using one of the methods described above, only if the message is a predetermined message.

In some of the preferred embodiments of the invention the application part AP is also arranged to change the telephone number in the messages arriving from the server to the subscriber identifier.

The invention has above been explained assuming that the identifier used in the network for identifying the subscriber is the subscriber identifier IMSI and that the identifier used in the server for identifying the subscriber is the telephone number MSISDN. However, it is obvious for those skilled in the art how to apply the invention when another form of identifier than the one mentioned above is used for identifying the subscriber in the network 10 and/or in the server. Furthermore the embodiments explained above and/or the properties thereof can be combined in order to accomplish new embodiments according to the invention.

Even though the invention is explained above using the mobile communications network as an example, the invention is not restricted to the exchanges of radio networks or other wireless networks, but it is obvious for those skilled in the art how the invention can be applied to other telecommunications systems and to networks based on wireless data transmission and to fixed networks.

It is to be understood that the above description and the figures related thereto are merely intended to illustrate the present invention. It will be apparent for those skilled in the art that different variations and modifications of the invention can be provided without deviating from the scope and spirit of the invention presented in the appended claims.

The invention claimed is:

1. A method of associating a subscriber of a service provider with a message from the subscriber sent over a communications network, comprising:
    receiving the message at a gateway of the communications network, the message including a first unique subscriber identifier associated with the subscriber and the communications network, wherein the first unique subscriber identifier comprises an International Mobile Subscriber Identity (IMSI) number or a Temporary Mobile Subscriber Identity (TMSI) number;
    distinguishing, at the gateway, the first unique subscriber identifier from the message;
    searching in storage, at the gateway, for a subscriber identifier pair, wherein the subscriber identifier pair comprises a correlation of the first unique subscriber identifier associated with the subscriber and the communications network and a second unique subscriber identifier associated with the subscriber and the service provider, wherein the second unique subscriber identifier comprises a Mobile Subscriber International ISDN (MSISDN) number;
    replacing, at the gateway, the first unique subscriber identifier in the message with the second unique subscriber identifier; and,
    sending the message from the gateway to a server of the service provider.

2. The method of claim 1, wherein the message is received at the gateway from a Home Location Register (HLR) or a Visiting Location Register (VLR).

3. The method of claim 1, wherein, based on the message, the server identifies the subscriber associated with the message.

4. The method of claim 1, wherein the server is a Wireless Application Protocol (WAP) server.

5. The method of claim 4, wherein the message further comprises an Internet Protocol (IP) address.

6. The method of claim 5, wherein the WAP server is configured to store the IP address and the second unique subscriber identifier.

7. The method of claim 6, wherein the gateway and server are integrated.

8. The method of claim 1, further comprising sending an acknowledgement of the received message from the gateway to a network node of the communications network.

9. The method of claim 1, further comprising:
    receiving a new subscriber message from the server at the gateway, the message including at least the second unique subscriber identifier;
    storing the second unique subscriber identifier in the gateway;
    requesting from a device on the communications network the first unique subscriber identifier, the request including at least the second unique subscriber identifier;
    receiving the first unique subscriber identifier from the device at the gateway; and
    storing the first unique subscriber identifier with the second unique subscriber identifier as the subscriber identifier pair.

10. The method of claim 9, further comprising sending an acknowledgement of the new subscriber message from the gateway to the server.

11. The method of claim 9, wherein the device comprises a database in the communications network.

12. The method of claim 11, wherein the database comprises a Home Location Register (HLR).

13. The method of claim 11, wherein the database comprises a Visiting Location Register (VLR).

14. A method of associating a subscriber of a service provider with a message from the subscriber sent over a communications network comprising:
    receiving the subscriber message at a gateway of the communications network, the message including a first unique subscriber identifier associated with the subscriber and the communications network, wherein the first unique subscriber identifier comprises an International Mobile Subscriber Identity (IMSI) number or a Temporary Mobile Subscriber Identity (TMSI) number;
    sending a request message, from the gateway, to a device on the communications network, the request including at least the first unique subscriber identifier;
    receiving, at the gateway, a response message including the second unique subscriber identifier associated with the subscriber and the service provider from the device to the gateway, wherein the second unique subscriber identifier comprises a Mobile Subscriber International ISDN (MSISDN) number;
    distinguishing, at the gateway, the second unique subscriber identifier from the response message;
    replacing, at the gateway, the first unique subscriber identifier in the subscriber message with the second unique subscriber identifier; and
    sending the subscriber message from the gateway to a server of the service provider.

15. The method of claim 14, wherein the second unique identifier is a default value MSISDN.

16. The method of claim 15, wherein the default value MSISDN is the same for all servers.

17. The method of claim 15, wherein the default value MSISDN is specific to the server.

18. The method of claim 14, wherein the request message comprises data about the server.

19. The method of claim 14, wherein the request message comprises data about the service for which the second unique subscriber identifier is requested.

20. The method of claim 19, wherein the gateway and server are integrated.

21. The method of claim 14, further comprising sending an acknowledgement of the subscriber message from the gateway to a network node of the communications network.

22. The method of claim 14, wherein the device comprises a database in the communications network.

23. The method of claim 22, wherein the database comprises a Home Location Register (HLR).

24. The method of claim 22, wherein the database comprises a Visiting Location Register (VLR).

25. A method of associating a subscriber of a service provider with a message from the subscriber sent over a communications network, comprising:

receiving, at a gateway, a new subscriber message from the service provider, the message including at least a second unique subscriber identifier;

storing the second unique subscriber identifier in the gateway;

requesting from a device on the communications network a first unique subscriber identifier, the request including at least the second unique subscriber identifier;

receiving the first unique subscriber identifier from the device at the gateway;

storing the first unique subscriber identifier with the second unique subscriber identifier as the subscriber identifier pair;

receiving the message including the first unique subscriber identifier associated with the subscriber and the communications network;

distinguishing the first unique subscriber identifier from the message;

searching in storage for the subscriber identifier pair, wherein the subscriber identifier pair comprises a correlation of the first unique subscriber identifier associated with the subscriber and the communications network and the second unique subscriber identifier associated with the subscriber and the service provider;

replacing in the message the first unique subscriber identifier with the second unique subscriber identifier; and sending the message to the service provider.

* * * * *

UNITED STATES PATENT AND TRADEMARK OFFICE
CERTIFICATE OF CORRECTION

PATENT NO. : 7,525,987 B2
APPLICATION NO. : 10/243071
DATED : April 28, 2009
INVENTOR(S) : Ala-Luukko It is certified that error appears in the above-identified patent and that said Letters Patent is hereby corrected as shown below:

On the title page,

[*] Notice: Subject to any disclaimer, the term of this patent is extended or adjusted under 35 USC 154(b) by (1127) days Delete the phrase "by 1127 days" and insert -- by 1141 days --

Signed and Sealed this

Eighth Day of September, 2009

David J. Kappos
*Director of the United States Patent and Trademark Office*